(12) United States Patent
Rohs

(10) Patent No.: US 7,296,747 B2
(45) Date of Patent: Nov. 20, 2007

(54) VISUAL CODE SYSTEM FOR CAMERA-EQUIPPED MOBILE DEVICES AND APPLICATIONS THEREOF

(76) Inventor: Michael Rohs, ETH Zurich (Federal Institute of Technology), Haldeneggsteig 4, IFW D 43.1, Zurich (CH) 8092

( * ) Notice: Subject to any disclaimer, the term of this patent is extended or adjusted under 35 U.S.C. 154(b) by 136 days.

(21) Appl. No.: 11/105,150

(22) Filed: Apr. 13, 2005

(65) Prior Publication Data
US 2005/0242189 A1 Nov. 3, 2005

Related U.S. Application Data

(60) Provisional application No. 60/563,669, filed on Apr. 20, 2004.

(51) Int. Cl.
*G06K 5/04* (2006.01)
*G06K 7/10* (2006.01)
*G06K 9/32* (2006.01)

(52) U.S. Cl. ............................. 235/462.08; 235/462.04

(58) Field of Classification Search ........... 235/462.04, 235/462.07, 462.08, 462.09, 462.1, 462.11, 235/462.15, 462.25, 462.41, 462.01; 382/164, 382/165, 181, 237, 289, 293
See application file for complete search history.

(56) References Cited

U.S. PATENT DOCUMENTS

| 4,238,768 A | 12/1980 | Mitsuya et al. |
| 4,323,973 A | 4/1982 | Greenfield |
| 4,554,593 A | 11/1985 | Fox et al. |
| 4,578,766 A * | 3/1986 | Caddy ........................ 345/440 |
| 4,692,603 A | 9/1987 | Brass et al. |
| 4,728,783 A | 3/1988 | Brass et al. |
| 4,754,127 A | 6/1988 | Brass et al. |

(Continued)

FOREIGN PATENT DOCUMENTS

WO  WO-2005/020140 A2  3/2005

(Continued)

OTHER PUBLICATIONS

Trier, O.D., Jain, A.K., "Goal-Directed Evaluation of Binarization Methods", Pattern Analysis and Machine Intelligence, IEEE Transactions on, Dec. 1995, ISSN: 0162-8828.

(Continued)

*Primary Examiner*—Michael G. Lee
*Assistant Examiner*—Kumiko C. Koyama
(74) *Attorney, Agent, or Firm*—Wilmer Cutler Pickering Hale and Dorr LLP

(57) ABSTRACT

A visual code system wherein camera-equipped mobile phones (or similar devices, such as wireless PDAs) are used to identify and decode images that contain one or more "visual codes." By recognizing a code tag, the device can determine a bit pattern or an integer number encoded in the tag (the code value), the targeted object or image element, as well as additional parameters, such as the viewing angle of the camera. Code recognition is performed on the mobile device itself. When the mobile device is equipped with a wireless communication channel, it can be used to retrieve online content or to access information on the Internet based on the sensed code and its parameters. The retrieved content can then be presented on the mobile device.

25 Claims, 6 Drawing Sheets

U.S. PATENT DOCUMENTS

| | | |
|---|---|---|
| 4,774,569 A | 9/1988 | Morton et al. |
| 4,782,221 A | 11/1988 | Brass et al. |
| 4,874,936 A | 10/1989 | Chandler et al. |
| 4,896,029 A | 1/1990 | Chandler et al. |
| 4,969,202 A | 11/1990 | Groezinger |
| 4,998,010 A | 3/1991 | Chandler et al. |
| 5,016,118 A | 5/1991 | Nannichi |
| 5,103,490 A * | 4/1992 | McMillin .................... 382/284 |
| 5,113,454 A | 5/1992 | Marcantonio et al. |
| 5,153,418 A | 10/1992 | Batterman et al. |
| 5,179,599 A | 1/1993 | Formanek |
| 5,189,292 A | 2/1993 | Batterman et al. |
| 5,223,701 A | 6/1993 | Batterman et al. |
| 5,235,172 A | 8/1993 | Oehlmann |
| 5,243,443 A | 9/1993 | Eschbach |
| 5,243,444 A | 9/1993 | Fan |
| 5,243,655 A | 9/1993 | Wang |
| 5,276,315 A | 1/1994 | Surka |
| 5,327,240 A | 7/1994 | Golston et al. |
| 5,331,442 A | 7/1994 | Sorimachi et al. |
| 5,345,317 A | 9/1994 | Katsuno et al. |
| 5,510,604 A | 4/1996 | England et al. |
| 5,621,203 A | 4/1997 | Swartz et al. |
| 5,691,773 A | 11/1997 | Wang et al. |
| 5,767,978 A | 6/1998 | Revankar et al. |
| 5,778,092 A | 7/1998 | MacLeod et al. |
| 5,783,811 A * | 7/1998 | Feng et al. ............ 235/462.42 |
| 5,811,781 A | 9/1998 | Ackley |
| 5,852,677 A | 12/1998 | Nakamura et al. |
| 5,862,270 A | 1/1999 | Lopresti et al. |
| 5,877,486 A | 3/1999 | Maltsev et al. |
| 5,890,021 A | 3/1999 | Onoda et al. |
| 5,909,505 A | 6/1999 | Katayama et al. |
| 5,915,039 A | 6/1999 | Lorie et al. |
| 5,963,669 A | 10/1999 | Wesolkowski et al. |
| 5,969,325 A | 10/1999 | Hecht et al. |
| 6,045,515 A | 4/2000 | Lawton |
| 6,082,619 A | 7/2000 | Ma et al. |
| 6,091,511 A | 7/2000 | Ben Dror et al. |
| 6,101,285 A | 8/2000 | Fan |
| 6,115,488 A | 9/2000 | Rogers et al. |
| 6,115,508 A | 9/2000 | Lopresti et al. |
| 6,137,898 A | 10/2000 | Broussard et al. |
| 6,201,612 B1 | 3/2001 | Matsushiro et al. |
| 6,201,901 B1 | 3/2001 | Zhou et al. |
| 6,282,307 B1 | 8/2001 | Armato, III et al. |
| 6,347,156 B1 | 2/2002 | Kamada et al. |
| 6,366,696 B1 | 4/2002 | Hertz et al. |
| 6,371,373 B1 | 4/2002 | Ma et al. |
| 6,418,244 B2 | 7/2002 | Zhou et al. |
| 6,431,452 B2 * | 8/2002 | Feng .................... 235/472.01 |
| 6,446,868 B1 | 9/2002 | Robertson et al. |
| 6,512,919 B2 | 1/2003 | Ogasawara |
| 6,565,003 B1 | 5/2003 | Ma |
| 6,585,157 B2 | 7/2003 | Brandt et al. |
| 6,604,682 B2 * | 8/2003 | Wakamiya et al. .... 235/462.01 |
| 6,631,012 B2 | 10/2003 | Athens et al. |
| 6,631,843 B2 | 10/2003 | Schuessler |
| 6,650,766 B1 | 11/2003 | Rogers et al. |
| 6,674,919 B1 | 1/2004 | Ma et al. |
| 6,735,341 B1 | 5/2004 | Horie et al. |
| 6,735,745 B2 | 5/2004 | Sarig et al. |
| 6,752,317 B2 * | 6/2004 | Dymetman et al. .... 235/462.45 |
| 6,802,450 B2 | 10/2004 | Cheung et al. |
| 6,832,729 B1 * | 12/2004 | Perry et al. ............ 235/472.01 |
| 6,837,432 B2 | 1/2005 | Tsikos et al. |
| 6,898,329 B1 | 5/2005 | Takahashi |
| 2001/0041581 A1 | 11/2001 | Hansson |
| 2002/0071076 A1 | 6/2002 | Webb et al. |
| 2002/0084330 A1 | 7/2002 | Chiu |
| 2002/0090107 A1 | 7/2002 | Acharya et al. |
| 2002/0102966 A1 | 8/2002 | Lev et al. |
| 2002/0187774 A1 | 12/2002 | Ritter et al. |
| 2003/0007696 A1 | 1/2003 | Saito |
| 2003/0074286 A1 | 4/2003 | Rodrigo |
| 2003/0123710 A1 | 7/2003 | Nakazawa et al. |
| 2004/0042670 A1 | 3/2004 | Moroo et al. |
| 2004/0101183 A1 | 5/2004 | Mullich et al. |
| 2004/0240737 A1 | 12/2004 | Lim et al. |
| 2005/0035206 A1 | 2/2005 | Attia et al. |
| 2005/0121521 A1 | 6/2005 | Ghai et al. |
| 2005/0198095 A1 | 9/2005 | Du et al. |

FOREIGN PATENT DOCUMENTS

| | | |
|---|---|---|
| WO | WO-2005/062234 A2 | 7/2005 |

OTHER PUBLICATIONS

Heckbert, Paul S., "Fundamentals of Texture Mapping and Image Warping," Department of Electrical Engineering and Computer Science, University of California, Master's Thesis, 1989.

Lew, Michael S., "Principles of Visual Information Retrieval," State of the Art in Shape Matching, 2001, pp. 87-119.

Rohs, Michael et al., "Entry Points into a Smart Campus Environment - Overview of the ETHOC System," Institute for Pervasive Computing Swiss Federal Institute of Technology.

Tsai, Roger Y., "A Versatile Camera Calibration Tedhnique for High-Accuracy 3D Maching Vision metrology Using Off-the-Shelf TV Cameras and Lenses," IEEE Journal of Robotics and Automation, 1987, RA-3(4):323-344.

Wellner, Pierre D., "Adaptive Thresholding for the DigitalDesk," EuroPARC Technical REport EPC-93-110, 1993, pp. 1-17.

Bottller, Stefan, "SMS-Flaschenpost erreicht Millionen," W&V Wochenmagazin Fur Marketing, Werburn, Medien und E-Business, Nov. 28, 2003, pp. 44-45.

Rohs, Michael et al., "Entry Points into a Smart Campus Environment - Overview of the ETHOC System," Institute for Pervasive Computing Swiss Federal Institute of Technology, ICDCS 2003 Workshops, May 2003.

* cited by examiner

FIG. 5

VISUAL CODE SYSTEM FOR CAMERA-EQUIPPED MOBILE DEVICES AND APPLICATIONS THEREOF

CROSS-REFERENCE TO RELATED APPLICATIONS

This application claims the benefit of Provisional Application Ser. No. 60/563,669 filed Apr. 20, 2004.

FIELD OF THE INVENTION

The present invention relates to the field of decoding machine readable codes utilizing camera-equipped mobile devices. More specifically, the present invention discloses a proprietary visual code which is capable of being decoded and utilized by virtually any camera-equipped mobile device.

BACKGROUND OF THE INVENTION

Barcodes have been utilized for identifying and pricing objects for more than thirty years. Most typically, barcodes are used in retail to identify the item of merchandise. For example, a gallon of milk may contain a barcode that, when scanned, will notify the cashier of the price of the milk.

Yet in recent years, barcodes have acquired new purposes as computers and barcode scanners have become more portable. The circuitry required to scan a conventional one-dimensional barcode can now be housed in a device as small as a typical keychain. As a result, many mobile telephones, personal digital assistants ("PDAs"), and pagers can be retrofitted with or connected to a laser-based scanning device. This allows the mobile device to function as a scanner capable of storing hundreds or thousands of scanned barcodes.

Mobile devices with attached scanners have allowed for the development of a new niche in the wireless electronics business. Some companies have developed software and hardware which allows a user to scan any barcode and be redirected to media information (e.g., a website, product description, price, etc.) about the scanned product. These programs provide a link between the physical and online world which previously did not exist.

However, mobile devices with attached scanners possess some drawbacks which have curtailed their expansion into the mobile marketplace. First, there are few mobile devices produced for the general public that contain integrated laser-based scanners. Therefore, for a user to acquire scanning capability for a mobile device, he/she must purchase additional equipment. The additional scanning equipment also adds size and weight to the mobile device, thereby reducing its mobility.

Currently, many cell phones and mobile devices are available with built-in cameras. The explosion of the availability of affordable digital cameras and their inclusion into mobile devices is driven by several factors. One of the most important is the recent availability of inexpensive image sensors based on CMOS technology. The cameras on these devices provide a means for capturing the barcode information which was previously only accessible via a laser-based scanner. Decoding barcode images from digital cameras included in mobile devices presents several difficult problems. These problems go well beyond the challenges addressed in commercial barcode readers.

Therefore, there clearly exists a need for a visual code system which is capable of being decoded on a camera-equipped mobile device. The visual code system should be able to be decoded from a wide range of angles and distances for use in different applications.

SUMMARY OF THE INVENTION

The visual code system of the present invention lets camera-equipped mobile devices act as sensors and decoders for proprietary two-dimensional visual codes. The visual codes can be printed on paper documents, displayed on electronic screens, or attached to physical objects and act as a key to access object-related information and functionality.

Enhancing mobile devices in this manner is promising, because they are in constant reach of their users and are thus available in many everyday situations. They provide continuous wireless connectivity, and models with integrated cameras are becoming more and more popular. The ability to detect objects in the user's immediate vicinity strengthens the role of mobile phones in m-commerce, education, and gaming scenarios. Additionally, it offers a natural way of interaction and makes data entry more convenient.

The visual code system provides the basis for superimposing textual or graphical information over the camera image in near real-time, providing the user with the sense of "augmented reality". This allows for a wide assortment of application possibilities in situations where information is to be closely linked to physical objects. An example is the maintenance of devices or apparatuses in the field. For example, individual parts of an apparatus may be associated with different visual codes. By decoding different visual codes, graphical information, which is aligned with the items in the image, can be superimposed over the camera image. Further application possibilities include showing maintenance instructions, ordering spare parts, checking a maintenance schedule, etc. Other closely related applications include convenient order placing in mail-order catalogs, entering reference numbers in online banking applications, linking up-to-date online content to newspapers, supporting mobile marketing advertising campaigns, integration with TV commercials, vote-now, or buy-now TV spots, booking tickets for events, and simplifying interaction with the mobile device itself.

The key features of the visual code system of the present invention are a built-in orientation-independent coordinate system, rotation angle determination, tilting determination, and distance determination that enable a large number of applications, such as item selection and form entry. The recognition algorithm precisely determines the coordinates of a targeted point relative to the coordinate system that is defined by the visual code. The coordinates are independent of the orientation, tilting, or rotation of the visual code in the camera image. This allows the application to associate each point on the viewed image (and therefore arbitrarily shaped areas) with information and with specific operations. In this manner, a single visual code can be associated with multiple such areas (e.g., the individual cells of a table or elements and regions of an image).

The recognition algorithm provides the rotation angle of the visual code in the camera image as an additional input parameter. This can be employed to simplify the interaction with the mobile device. Simply by changing the orientation of the mobile device, different information is displayed, without requiring any interactions via the keypad. Horizontal and vertical tilting is used as an additional input parameter in the same manner as described above (i.e., associating different information with different tilting angles). The mapping between the image coordinate system and the code coordinate system is also used to un-warp projective distortion in the camera image, which allows the automatic capture of form elements. Individual fields of the printed form are un-warped to remove the distortion and thus prepare them for further processing, such as transmitting them to an online server.

INTERACTION SCENARIOS

New interaction possibilities open up when mobile phones or PDAs are enhanced to act as sensors for real-world objects. The gap between the physical world surrounding the user and the virtual world is narrowed by offering a natural way of "picking up" data in everyday situations. Information becomes collocated with physical entities and is thus situated and grounded in the real-world context. Mobile phones are in an excellent position to contribute to this vision, because they are ubiquitously available devices, constantly within reach of the user. The short interaction time required for recognizing codes is crucial for usability in a mobile setting. It does not require much effort on behalf of the user and takes just a few seconds.

There are many application scenarios which could take advantage of using visual codes: In mail-order catalogs, items could be selected by scanning visual codes to conveniently place orders. In online banking applications, long reference codes or transaction numbers often need to be manually copied from printed forms. Visual codes and mobile phones could replace expensive dedicated devices which perform this task. In newspapers, visual codes could be used to store or rate newspaper articles, to get background information related to an advertisement, or for updates on information which quickly gets obsolete, like stock quotes and weather forecasts. Using the code coordinate system, it is possible to define printed image maps with predefined sensitive areas that are associated with online content. In this way, a single code can be associated with multiple items: For example, areas on a geographic map could be linked to weather forecasts corresponding to those regions and each row in a printed table containing stock quotes could be linked to a chart which is displayed on the phone.

In the emerging area of mobile marketing, visual codes could be used to simplify SMS campaigns and SMS lotteries. In an advertising campaign Coca Cola printed code numbers on the labels of 160 million soft-drink bottles. By sending a number via SMS, customers got logos, ring tones, and greeting cards, and could take part in a lottery. 5.9 million SMS messages were sent, which corresponds to a response ratio of 3.7%. Using visual codes would make the process more convenient for the user and might result in even higher attendance in such campaigns, which would be commercially very interesting.

The proposed 2-dimensional codes are also suitable for display on electronic screens, such as computer monitors, TV screens, public wall displays, and even on the tiny screens of handheld devices. Questionnaires, surveys, and polls on TV (like selecting the best candidate of a TV show) could be realized by overlaying visual codes over the screen image. This idea also has commercial implications. The music company Polydor used SMS as a mobile response channel in a TV spot advertising a CD. Viewers could order the CD via SMS prior to the official release date, which immediately increased sales figures. Again, using visual codes, the response ratio might be substantially increased. Camera-equipped mobile phones are not only capable of retrieving an object ID, but can also be used for more complex forms of interaction. Our code recognition system also provides the phone's orientation, amount of rotation, and coordinates of the image center.

Therefore, it is an object of the present invention to provide a visual code system which utilizes an orientation-independent coordinate system that is defined by a visual code and the associated recognition algorithm that determines the coordinates of a targeted point in the camera image relative to that coordinate system.

It is an additional object of the present invention to provide a visual code system which associates multiple regions of an image with a single code, wherein each region is linked to different online information and operations associated with the different regions.

Yet another object of the present invention is to provide a visual code system which includes a rotation determination feature, a vertical and horizontal tilting determination feature, and a distance determination feature, which allows different rotation, tilting, and distance values to be associated with different information.

Another object of the present invention is to utilize the visual code system of the present invention for item selection, information display in textual, graphical (e.g. on the screen of the mobile device or on a nearby electronic display), auditory (e.g., via the mobile device's speaker, headset or earphone), or tactile form (e.g., via phone vibration), and triggering specific operations.

An additional object of the present invention is to provide an application in which textual or graphical feedback is superimposed on the camera image itself and correctly aligned ("registered") with the items present in the image, thereby giving the user a sense of "augmented reality."

A further object of the present invention is to provide an application wherein the visual code system is used in conjunction with printed forms for convenient data entry.

These and other objects of the present invention will be made clearer with reference to the following detailed description and accompanying drawings.

BRIEF DESCRIPTION OF THE DRAWINGS

FIG. 5 depicts another example of a printed document containing visual codes.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

Figure 1:
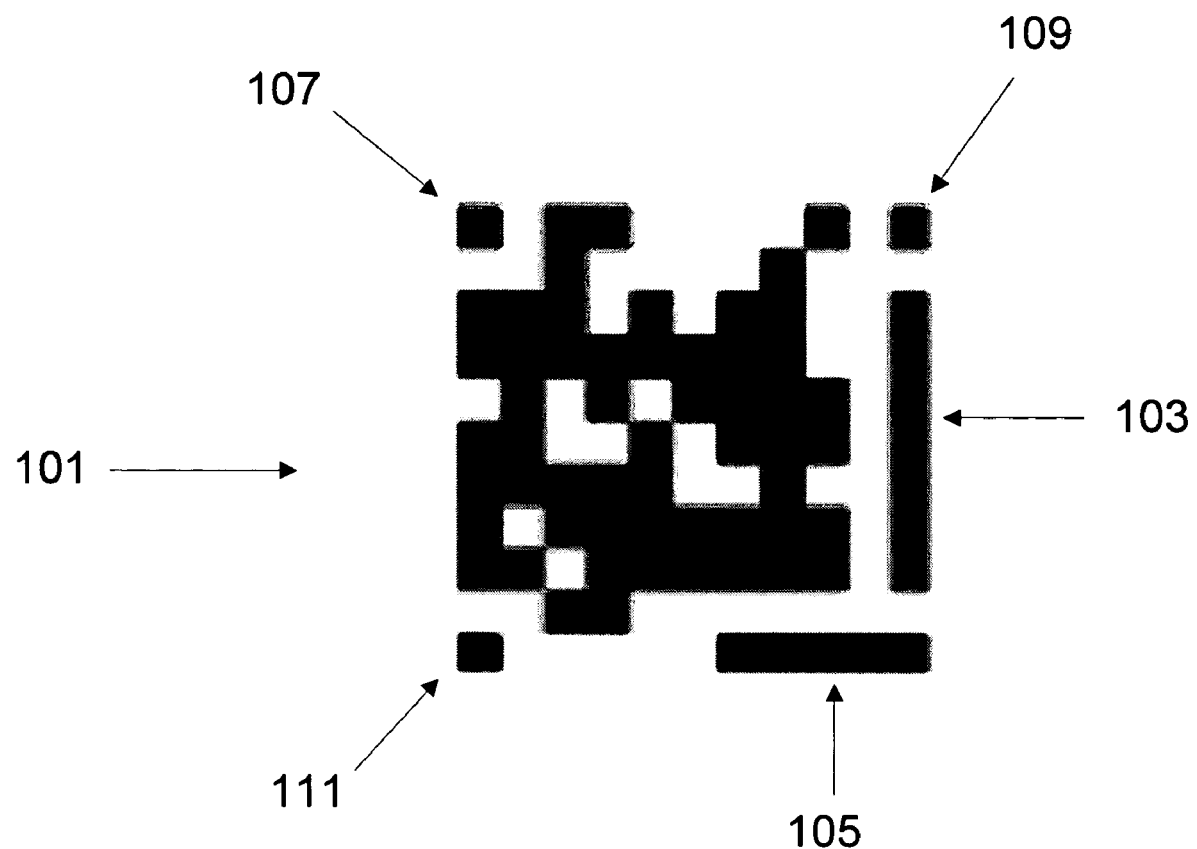
FIG. 1 depicts an example of the visual code and its novel features.

With reference first to FIG. 1, shown is an example of visual code 101 utilized in the present invention. Visual code 101 consists of large guide bar 103 and small guide bar 105 for determining the location and orientation of visual code

101, three cornerstones 107, 109, and 111, for detecting distortion and the data area with the actual code bits. The displayed version of visual code 101 has a capacity of 83 bits, but its design is generic and suitable for extension to a larger number of bits. Visual code 101 can be reliably located even in a low quality image which is small and tilted.

Visual code 101 may be printed utilizing either standard ink or infrared ink. If infrared ink is utilized to print visual code 101, the digital camera must be capable of identifying infrared images. Infrared ink has the advantage that visual code 101 would not be visible to the naked eye. Therefore, if the algorithm of the present invention were constantly running in the background whenever the digital camera of a mobile device was being used, the decoding of visual code 101 could be utilized to make certain information appear.

The three cornerstones 107, 109, and 111 define the coordinate system induced by the code. Cornerstone 107 is located at the origin, or position (0,0). Similarly, cornerstone 109 is said to be located at position (10,0) while cornerstone 111 is located at position (0,10). In this coordinate system, the center of large guide bar 103 is located at position (10,5) while the center of small guide bar 105 is located at position (8,10). The code requires a white space of a single code element around the code (1 unit in the code coordinate system). Multiple visual codes may be printed next to each other, for example arranged in a grid. A white space of a single code element around two neighboring codes (1 unit in the code coordinate system) is required.

Figure 2:
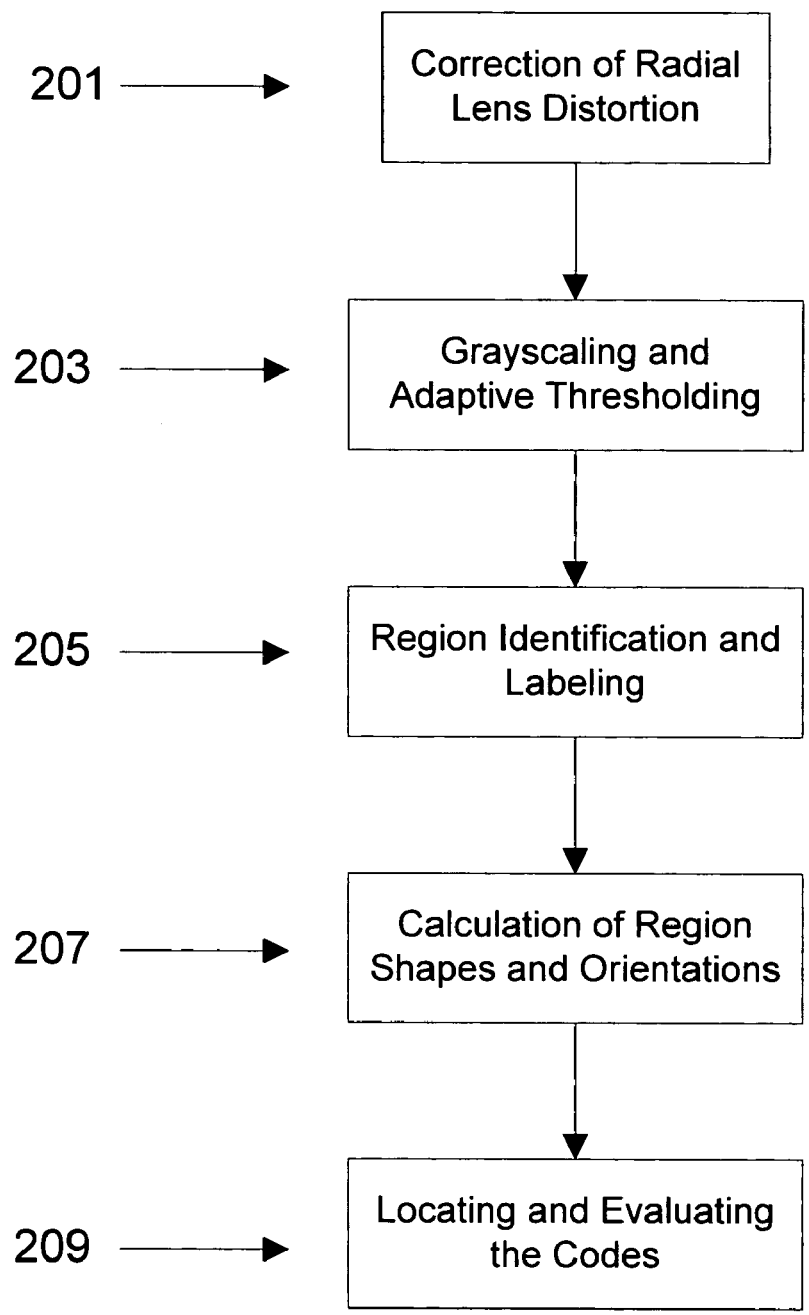
FIG. 2 depicts a flowchart showing the steps utilized by a camera-equipped mobile device to decode a visual code.

Next, with reference to FIG. 2, shown is a flowchart depicting the steps utilized by a camera-equipped mobile device to decode visual code 101. First, the image captured by the digital camera is corrected for radial distortion in step 201. The image obtained from the digital camera typically shows some amount of barrel distortion. However, radial lens distortion is less an issue with newer phone cameras, especially if the code only occupies a small area of the image. It is corrected by shifting each pixel radially towards the center of the image. The displacement only depends on the distance of the pixel from the image center and not on the particular image to be corrected. The following correction function produces adequate results (w and h are the pixel width and pixel height of the image, respectively, r is the distance from the image center, and κ is a constant that reflects the amount of radial distortion of the lens):

$$r = \sqrt{(x_{distorted} - w/2)^2 + (y_{distorted} - h/2)^2}$$
$$x_{undistorted} = (x_{distorted} - w/2)(1 + \kappa r^2) + w/2$$
$$y_{undistorted} = (y_{distorted} - h/2)(1 + \kappa r^2) + h/2$$

For the integrated camera of the Nokia 7650, $\kappa = 6 \times 10^{-7}$ was found acceptable by manual testing. For the newer Nokia 6600, 7610, and 6630, no correction was necessary. Even for the Nokia 7650, code recognition works without correction.

Step 201 is optional, because a single visual code typically only covers a small area of the camera image. In this case, radial lens distortion is not significant. However, for some applications, like those involving precise selection of items in the camera image, this step may increase accuracy.

Next, the image undergoes grayscaling and adaptive thresholding in step 203 because the three color channels in the image often differ in their sharpness and contrast quality. Therefore, the algorithm uses the formula gray (red+ green)/2 instead of the more straightforward version gray= (red+green+blue)/3 or the ITU-standardized formula for luminance Y=0.2126 red+0.7152 green+0.0722 blue. This formula is computationally efficient and produces an adequate starting point for thresholding.

An adaptive method is taken to produce a black-and-white version of the gray scaled image, because the brightness of the camera image is not constant and the printed code may be unevenly illuminated. The algorithm uses a (weighted) moving average of the gray values while traversing the image in a snake-like fashion. The average $g_s(n)$ is updated according to the formula:

$$g_s(n) = g_s(n-1) \cdot \left(1 - \frac{1}{s}\right) + p_r$$

with $p_n$ denoting the gray value of the current pixel and s the width of the moving average. $g_s$ is initialized with $_s(0)=\frac{1}{2}CS$ g, where c is the maximum possible gray value. The color of the thresholded pixel T(n) is then chosen based on the formula:

$$T(n) = \begin{cases} 1, \text{ if } p_n < \frac{g_s(n)}{s} \cdot \frac{100-t}{100} \\ 0, \text{ otherwise} \end{cases}$$

The recommended values for t and s are t=15 and $$s = \frac{1}{8}w,$$

where w is the width of the image.

After the image has undergone grayscaling in step 203, the algorithm next attempts to identify and label the different regions of the image in step 205. This step consists of finding regions of neighboring black pixels, counting them, and assigning a number to each. The algorithm used is a well known two-phase method. In the first phase, the image is traversed row by row, assigning preliminary labels to the regions found. During this process, it may happen that two regions with different labels turn out to be in fact the same region. In this case, the equivalence of the two temporary labels is stored in a table. The second phase resolves the equivalences by merging the corresponding regions and assigns a final label to each region.

Next, the algorithm calculates the different regions' shapes and orientations in step 207. In order to identify candidates for orientation bars among the regions found, the notion of second-order moments is used. The second-order moments of a region consisting of the set of pixels R and having the center of gravity $(\bar{x},\bar{y})$ are defined as follows:

$$\mu_{xx} = \frac{1}{|R|} \sum_{(x,y) \in R} (x - \bar{x})^2$$

$$\mu_{yy} = \frac{1}{|R|} \sum_{(x,y) \in R} (y - \bar{y})^2$$

$$\mu_{xy} = \frac{1}{|R|} \sum_{(x,y) \in R} (x - \bar{x})(y - \bar{y})$$

-continued where, $$\bar{x} = \frac{1}{|R|}\sum_{(x,y)\in R} x$$

$$\bar{y} = \frac{1}{|R|}\sum_{(x,y)\in R} y$$

From these moments, an ellipsis $E=\{(x,y)|dx2+2exy+fy2\leq 1\}$ that has the same major and minor axis as the region can be defined by setting:

$$\begin{pmatrix} d & e \\ e & f \end{pmatrix} = \frac{1}{4\mu_{xx}\mu_{yy} - \mu_{xy}^2}\begin{pmatrix} \mu_{yy} & -\mu_{xy} \\ -\mu_{xy} & \mu_{xx} \end{pmatrix}$$

The ratio of the lengths of the major and the minor axis is a good measure for the "eccentricity" of the region: perfect circles and squares have a ratio equal to one whereas line segments have a ratio close to zero. This is very useful for identifying regions with a bar-like shape. Furthermore, the orientation vector of the major axis of the region can be calculated as:

$$\begin{pmatrix} -\sin\alpha \\ \cos\alpha \end{pmatrix} \text{ where } \alpha = \frac{1}{2}\arctan\left(\frac{2e}{d-f}\right)$$

Once the shapes and orientations of the different regions have been identified, the algorithm performs the step of locating and evaluating the visual codes in step 209. Locating codes in the image is done by looking for guide bar candidates and by finding corresponding cornerstones. Guide bar candidates are found by simply selecting those regions which have a small enough axis ratio (e.g. below 0.05). For each of these candidates, the size and orientation of the region is used to estimate the expected positions of small guide bar 105 and the three cornerstones 107, 109, and 111. It is then checked whether these features are actually present at the estimated positions. Cornerstone candidates found are only accepted if their axis ratio is above a certain limit (as stated earlier, theoretically they should have a ratio equal to one). If any of the code features (cornerstones 107, 109, and 111, and small guide bar 105) is not present for some guide bar candidate, this particular candidate is abandoned and the next one is examined.

Figure 3:
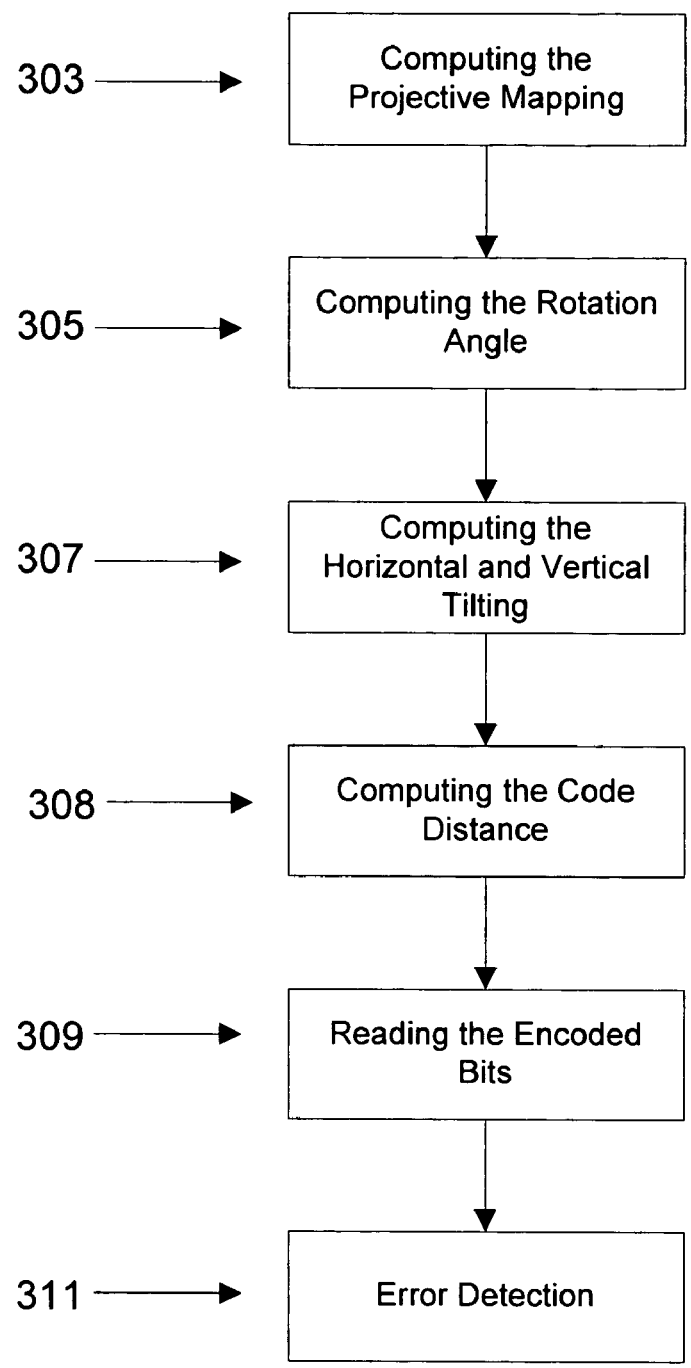
FIG. 3 depicts a flowchart showing the steps utilized by the code location step of FIG. 2.

Now, with reference to FIG. 3, shown is a flowchart showing the steps utilized by code location step 209 of FIG. 2. First, the algorithm computes the projective mapping from code coordinates to image coordinates (and the inverse mapping from image coordinates to code coordinates) in step 303. Once a guide bar candidate with all code features has been found, the algorithm assumes that this is indeed a code in the image and starts to read the encoded bits. To that end, the bit positions in the image must be determined, i.e. one needs a function that maps each code bit to an image pixel. Since the code elements are coplanar, there exists a unique homography (projective transformation matrix) between the code plane and the image plane. The projective mapping can be calculated once four corresponding points are known. In the algorithm, the correspondences are the centers of the three cornerstones 107, 109, and 111 plus the center of the small guide bar 105. This induces a code coordinate system with its origin at the upper left corner of the code.

The code coordinates of the upper left cornerstone 107, the upper right cornerstone 109, large guide bar 103, and the lower left cornerstone 111 are defined to be at (0,0), (10,0), (8,10), and (0,10). It is assumed that these elements have been found at image coordinates $(x_i,y_i)$, $i\in\{0, \ldots, 3\}$, respectively. A code coordinate (u,v), u,v $\in\{0, \ldots, 10\}$, is mapped to image coordinate (x,y), where $$x = \frac{au + bv + 10c}{gu + hv + 10}, y = \frac{du + ev + 10f}{gu + hv + 10}$$

The parameters a to h are calculated from the four reference points $(x_i, y_i)$, $i\in\{0, \ldots, 3\}$, as follows:

$$\Delta x_1 = x_1 - x_2 \quad \Delta y_1 = y_1 - y_2 \quad \Delta x_2 = x_3 - x_2 \quad \Delta y_2 = y_3 - y_2$$

$$\Sigma x = 0.8x_0 - 0.8x_1 + x_2 - x_3 \quad \Sigma y = 0.8y_0 - 0.8y_1 + y_2 - y_3$$

$$g = \frac{\Sigma x \Delta y_2 - \Sigma y \Delta x_2}{\Delta x_1 \Delta y_2 - \Delta y_1 \Delta x_2}$$

$$h = \frac{\Sigma y \Delta x_1 - \Sigma x \Delta y_1}{\Delta x_1 \Delta y_2 - \Delta y_1 \Delta x_2}$$

$$a = x_1 - x_0 + gx_1$$

$$b = x_3 - x_0 + hx_3$$

$$c = x_0 \quad f = y_0$$

$$d = y_1 - y_0 + gy_1$$

$$e = y_3 - y_0 + hy_3$$

The inverse mapping to the one described above is important for applications which select items visible in the image. Given a pixel coordinate, its corresponding coordinate in the coordinate system induced by the code can thus be obtained. An image coordinate (x,y) is mapped to a code coordinate (u,v) as follows:

$$u = 10 \cdot \frac{Ax + By + C}{Gx + Hy + I}, v = 10 \cdot \frac{Dx + Ey + F}{Gx + Hy + I}, \text{ with}$$

$$A = e - fh$$

$$B = ch - b$$

$$C = bf - ce$$

$$D = fg - d$$

$$E = a - cg$$

$$F = cd - af$$

$$G = dh - eg$$

$$H = bg - ah$$

$$I = ae - bd$$

The algorithm next computes the rotation angle of the visual code in the image in step 305. It takes on values between 0° and 359°. A code that has the same orientation as the image has rotation angle 0°. The rotation is determined by mapping the points (0,0) and (100,0) from the code coordinate system to the image coordinate system, resulting in the image points ($a_x$, $a_y$), and ($b_x$, $b_y$). The rotation angle is then determined as:

$$\alpha = \arctan\{(a_y - b_y)/(a_x - b_x)\} \cdot \frac{180}{\pi}$$

though several special cases have to be considered.

After the rotation angle of the visual code has been computer, the algorithm next determines the horizontal and vertical tilting in step 307. The term "tilting" denotes the amount of inclination of the image plane relative to the code plane. "Horizontal tilting" is the amount of inclination of the image plane relative to the horizontal axis of the visual code. Analogously, "vertical tilting" denotes the amount of inclination of the image plane relative to the vertical axis of the visual code. A tilting value of 1 means no tilting, a value less than 1 means tilting towards the left/top, and a value greater than 1 means tilting towards the right/bottom. The tilting parameters are computed as follows: Four image points with constant distance h (image height) from the image center point in the axis directions of the code coordinate system are computed. They are mapped to corresponding code coordinates and their distances to the center point are computed. The ratios of these distances determine the tilting parameters $t_x$ and $t_y$. They are independent of the size of the code in the image. From these ratios the tilting angles $t_x^\alpha$ and $\$t_y^\alpha$ can be determined, if a constant r is known that depends on the camera parameters. It can be obtained experimentally.

$i$ = image coordinates of the image center point $c$ = CodeCoordinates($i$)

$x$ = ImageCoordinates($c$ + (1, 0)) − $i$ $y$ = ImageCoordinates($c$ + (0, 1)) − $i$ $u = x/|x|$ $v = y/|y|$ $l = |CodeCoordinates(i - hu) - c|$ $r = |CodeCoordinates(i + hu) - c|$ $t = |CodeCoordinates(i - hv) - c|$ $b = |CodeCoordinates(i + hv) - c|$ $t_x = l/r$ $t_y = t/b$ $t_x^\alpha = \arctan\left(r\frac{t_x - 1}{t_x + 1}\right)$ $t_y^\alpha = \arctan\left(r\frac{t_y - 1}{t_y + 1}\right)$ Next, in step 308, the algorithm computes the distance of the code from the camera. If the real code size $S_{real}$ (the distance between the centers of the upper left and the upper right cornerstones of the printed code) and the camera's focal distance f are known, then the metric distance from the camera to the untilted visual code can be computed from $s_{image}$ (the pixel distance between the centers of the upper cornerstones in the camera image) using the pinhole model as ($w_{image}$ is the pixel width of the image)

$$D_{camera,code} = \frac{s_{real} \times f}{s_{image}/w_{image}}.$$

Since $s_{real}$ and f are typically not known and we want to use the code distance for interaction purposes rather than measuring its exact value, we define the distance in terms of the size of the visual code in the image. We set $d_{camera,code}$:=100 for the farthest distance at which a code is recognized in view finder mode. For typical devices this is the case when $s_{image}$=25 pixels, which amounts to 15.625% of the image width. Hence the distance is computed as $$d_{camera,code} = \frac{15.625}{s_{image}/w_{image}}.$$

Should $S_{real}$ and f be known, the metric distance can still be computed from $d_{camera,code}$.

It should be obvious to one skilled in the art that steps 303, 305, 307, 308, and 309 can be performed in any order because each step is discrete and outputs a different parameter or result.

Once the positions of the guide bars 103 and 105 and cornerstones 107, 109, and 111 have been identified and a suitable projective mapping (from code coordinates to image coordinates) has been computed, the algorithm reads the encoded bits in step 309 by simply testing the appropriate pixels (x,y) of the black-and-white image, using code coordinates (u,v) with u,v∈{0, . . . , 10} and (x,y)=ImageCoordinates((u,v)).

Error detection may optionally be performed in step 311. The (83,76,3) linear code employed encodes a 76-bit ID to an 83-bit codeword. The resulting hamming distance is three, which should be sufficient to identify wrong codes with a high probability. Alternatively, other error detecting or error correcting codes, such as Reed-Solomon codes, might be used for increased reliability and robustness against bit errors. This might come at the expense of slightly higher processing times and a lower number of bits actually available for data storage. As an example, 15 bits of the raw 83 bits might be used for Reed-Solomon error correcting codes, leaving 68 bits for data storage.

Applications of the Algorithm

A. Rotation Angle and Tilting Determination

In addition to the code coordinate of the image center, the recognition algorithm provides the orientation of the mobile device relative to the code. In particular, the algorithm provides the rotation of the code in the image, the viewing position (from left, from right, from top, from bottom), the amount of tilting of the image plane relative to the code plane, and the distance from the code to the camera. The projective mapping (planar homography) between the image plane and the code plane that the recognition algorithm implements, allows the mapping of arbitrary points given in image coordinates to corresponding points in code coordinates and vice versa.

B. Item Selection

The code coordinate system and the orientation determination features enable a number of interesting application scenarios involving the selection of items in printed documents. An example is the selection of articles depicted in printed mail-order catalogs. A single code is sufficient as long as the code coordinates of the items are known. This can be achieved by content creation software that creates "image maps" for the code and its associated sensitive areas. Articles in mail-order catalogs can thus be scanned, stored in the mobile device, and current information concerning the articles can be retrieved. The order can then be placed using the wireless communication channel provided by the mobile device.

Figure 4:
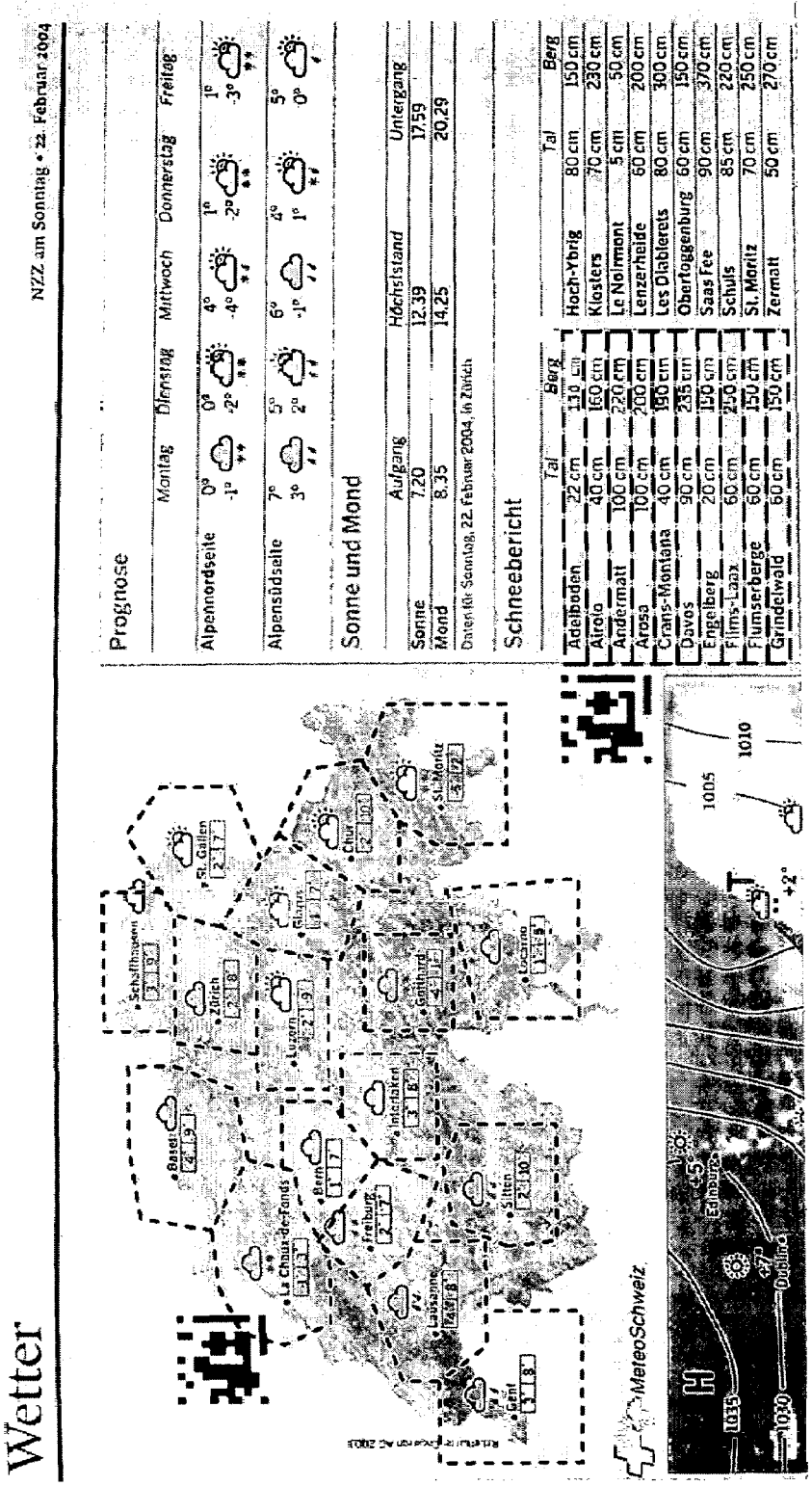
FIG. 4 depicts an example of a printed document containing visual codes.

For example, in FIG. 4, shown is an example of a printed document containing visual codes. The regions on the map and the entries in the table are individually mapped to different URLs and thus associated to online content.

In newspapers, online background information to articles, advertisements, or information which quickly gets obsolete, like weather forecasts or stock quotes, can be linked via visual codes. By using the code coordinate system, a single code located near several items of interest suffices. The exact area aimed at, like the local weather forecast, can be determined via the projective mapping by computing the vertical and horizontal distances to the visual code element. In a table of stock quotes, the row and column aimed at, and thus the desired information, can be obtained in the same manner. FIG. 4 shows a cut-out of a newspaper page containing a geographic map with the current weather data and a table containing the snow heights for various regions. The dotted lines drawn on the newspaper page indicate sensitive areas that are individually linked to online content. Such a mapping can be created with suitable content creation software. As a prototype, we developed a mapping tool which allows to draw the areas into the image and to specify the associated URL for each region. The tool computes the coordinates of these areas in the coordinate systems of the codes present in the image, and stores this data as an XML file. Multiple URLs can be specified for each region by taking into account further parameters that are provided by the code system, such as rotation and tilting. As shown in FIG. 4, a single code suffices to select the area and table entries, respectively. By rotating the mobile device, different aspects of the online information can be chosen: In the example, vertical orientation shows the snow depth for the selected area, while a slight rotation shows the current temperature.

As another application, visual codes can be used in mobile marketing to automate the input of coupon numbers into the mobile device. An example are SMS campaigns of soft-drink producers: The soft-drink bottles contain numbers (represented by visual codes), which can be sent as an SMS and thus allow the participation in lotteries. On TV, visual codes could be used for interactive input of answers to multiple choice questions in ad hoc surveys and quizzes or for the selection of candidates in a TV show. The code coordinates and the orientation of the device can serve as additional input parameters (in addition to the code value), for example to answer a multiple choice question.

Further application possibilities concern simplifying the interaction with the mobile device itself. Telephone numbers, for example, can be encoded as visual codes and printed on business cards or in phone books. Depending on the orientation of the code in the image, the device either immediately calls the encoded phone number, stores the virtual business card in the device's memory, or—for mobile phone numbers—starts the device's SMS editing application. Parts of the device's user interface, like deeply nested menus, can be externalized by associating them with a visual code and printing them on paper or showing them on a large screen.

A further possible application scenario of the presented invention is adding online content and operations to printed documents, like flyers, magazines, etc. An example online operation is selling tickets for events, theaters, or movies via the mobile phone.

FIG. 5. shows a page of a printed television magazine, which is equipped with embedded visual codes. By aiming at the printed visual codes, movie plot outlines can be shown, a list of the cast can be given, movie ratings can be displayed or submitted, movie trailers can be started, and tickets can be directly booked via the mobile phone.

C. Form Entry

Visual codes can also be combined with printed forms for the simplification of form input, in which the mobile device provides a wireless communication channel for conveniently and cheaply sending back the entered data. The fields of these forms can be check boxes, rulers, and canvas fields for free-hand textual or graphical input. Using the frame surrounding the form as a marker, the individual form elements can be precisely localized. The projective mapping of the recognition algorithm allows to "unwarp" parts of the image as well as the image as a whole.

Figure 6:
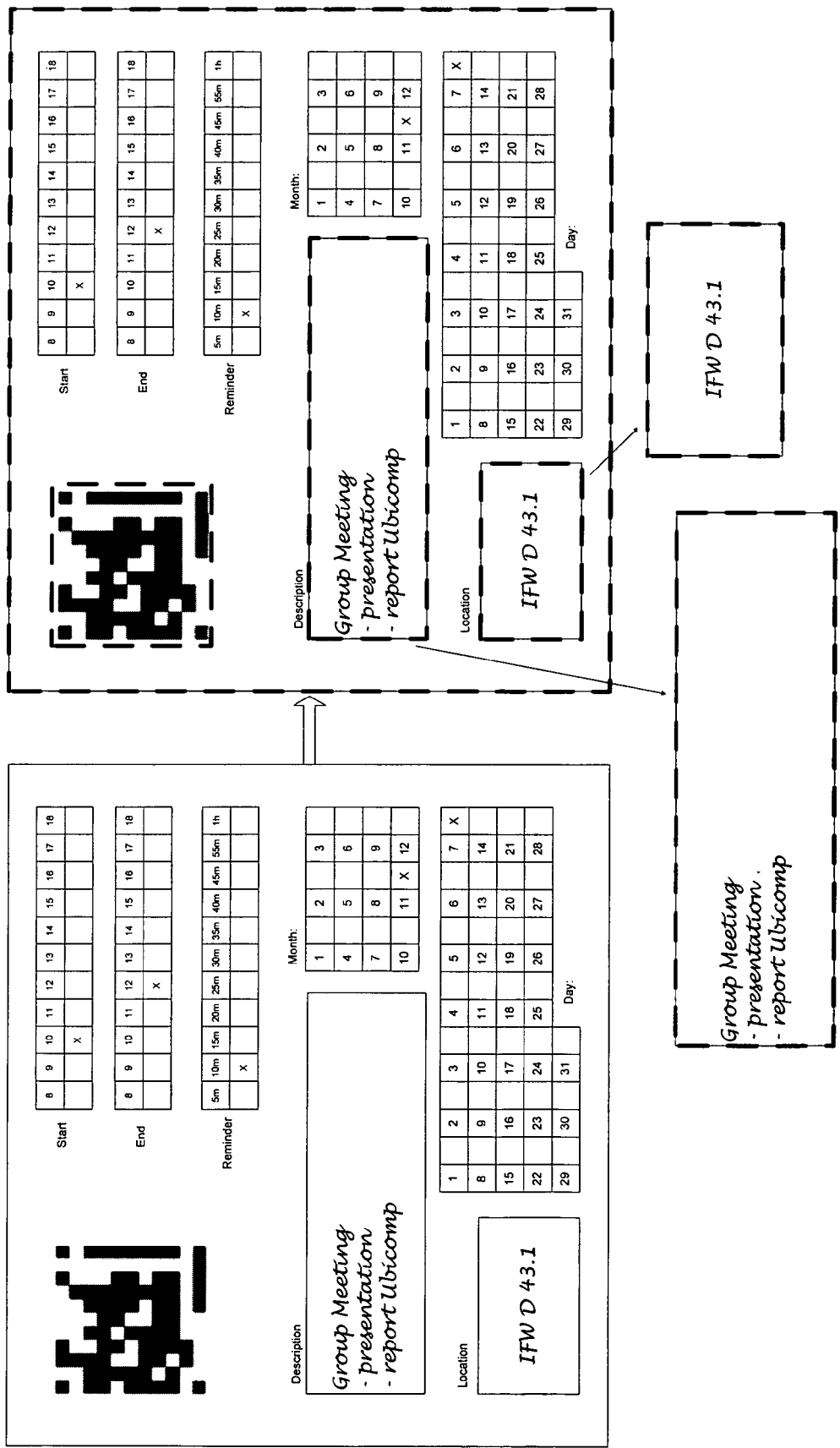
FIG. 6 depicts an example form for the entry of calendar events.

FIG. 6 shows an example form for the entry of calendar events. The recognition algorithm first recognizes the code and locates the edges of the frame. Then the checkboxes located in the form are scanned for check marks. Finally, the canvas fields are "unwarped", i.e. their tilting is removed as shown in the lower part of FIG. 6, and stored.

To define the forms, a markup language is used, which describes the structure of a form, including the positions and kinds of input elements it contains. The code is first used as a key to retrieve the form description from an online server. After interpreting the retrieved markup, user input can be categorized according to field type and sent back to the server.

I claim:

1. A method for decoding a visual code comprising:
    capturing a visual code image comprising at least one visual code utilizing a mobile device equipped with a digital camera;
    grayscaling said visual code image;
    thresholding said visual code image;
    identifying regions of interest in said visual code image;
    calculating the orientations and shapes of the identified regions of interest within said visual code image;
    locating said at least one visual code within said visual code image;
    computing a first projective mapping of said at least one visual code from a visual code image coordinate system to a visual code coordinate system;
    computing a second projective mapping of said at least one visual code from the visual code coordinate system to the visual code image coordinate system;
    computing a rotation angle of said at least one visual code located in said visual code image;
    computing horizontal and vertical tilting values of said at least one visual code;
    computing a distance of said at least one visual code from said mobile device;
    reading encoded bits in said at least one visual code to produce at least one decoded value; and
    displaying information on the mobile device associated with at least one of the identified regions of interest based on at least one of the at least one decoded value, the first projective mapping, the second projective mapping, the rotation angle, the horizontal tilting value, the vertical tilting value, and the distance.

2. A method for decoding a visual code according to claim 1, further comprising correcting said visual code image for radial lens distortion prior to grayscaling said visual code image.

3. A method for decoding a visual code according to claim 1, further comprising performing error detection on said at least one visual code.

4. A method for decoding a visual code according to claim 3, wherein said error detection is performed utilizing Reed-Solomon error detection.

5. A method for decoding a visual code according to claim 1, wherein said at least one visual code comprises three cornerstones, a small guide bar, and a large guide bar.

6. A method for decoding a visual code according to claim 5, wherein an individual visual code is located by identifying said cornerstones, said small guide bar, and said large guide bar.

7. A method for decoding a visual code according to claim 5, wherein said small guide bar and said large bar are identified by locating regions of said visual code image which have an axis ratio within a predetermined range.

8. A method for decoding a visual code according to claim 5, wherein said three cornerstones and said large guide bar are located at position $(0,0,)(10,0)$, and $(0,10)$, and wherein the center of said large guide bar is located at position $(8,10)$ in said visual code coordinate system.

9. A method for decoding a visual code according to claim 5, wherein multiple visual codes are arranged in a grid to store data across multiple visual codes and further comprising identifying said grid of codes.

10. A method for decoding a visual code according to claim 1, wherein said at least one visual code comprises three cornerstones, a small guide bar, and a large guide bar, and wherein an orientation of said small guide bar and said large guide bar are utilized when computing the rotation angle of said at least one visual code, computing the distance of said at least one visual code, and computing the tilting values of said at least one visual code.

11. A method for decoding a visual code according to claim 1, wherein grayscaling said visual code image is performed by calculating the value of each grayscale pixel by averaging the value of the red and green pixels.

12. A method for decoding a visual code according to claim 11, wherein said grayscale visual code image is converted to a black and white image using a weight-moving average algorithm.

13. A method for decoding a visual code according to claim 1, wherein at least one from the group comprising the rotation angle, horizontal tilting value, vertical tilting angle, and distance of said at least one visual code is utilized to select options from a menu.

14. A method for decoding a visual code according to claim 1, wherein said decoding occurs in real-time.

15. A method for decoding a visual code according to claim 14, further comprising overlaying a graphic over an image displayed on a screen of the camera wherein said overlayed graphic is geometrically aligned with objects in the image as the mobile device moves and the orientation of said at least one visual code changes.

16. A method for decoding a visual code according to claim 1, wherein the displayed information is retrieved from a database.

17. A method for decoding a visual code according to claim 16, wherein said database associates different uniform resource locators with the displayed information.

18. A method for decoding a visual code according to claim 1, further comprising selecting entries from a form by altering the orientation of said mobile device to said at least one visual code.

19. A method for decoding a visual code according to claim 1, wherein the displayed information is at least one of a movie plot outline, a video clip, an audio file, and a movie review.

20. A method for decoding a visual code according to claim 1, wherein said at least one visual code is printed utilizing infrared ink and wherein said digital camera captures said at least one visual code as an at least one infrared visual code.

21. A method for decoding a visual code according to claim 1, wherein a target point, expressed in the visual code coordinate system of an image displayed on a screen of the camera, is utilized as a parameter to select an entry from a database.

22. A method for decoding a visual code according to claim 1, wherein pointing said digital camera at said at least one visual code is facilitated by a cross hair that is displayed on a screen of said mobile device.

23. A method for decoding a visual code according to claim 22, wherein said screen of said mobile device is a touch screen, and wherein the position of said cross hair may be specified by using a stylus to specify a target point.

24. A computer-readable medium storing computer-executable instructions that, when executed by a processor, cause the processor to perform a method for decoding a visual code, the method comprising:
    capturing a visual code image comprising at least one visual code utilizing a mobile device equipped with a digital camera;
    grayscaling said visual code image;
    thresholding said visual code image;
    identifying regions of interest in said visual code image;
    calculating the orientations and shapes of the identified regions of interest within said visual code image;
    locating said at least one visual code within said visual code image;
    computing a first projective mapping of said at least one visual code from a visual code image coordinate system to a visual code coordinate system;
    computing a second projective mapping of said at least one visual code from the visual code coordinate system to the visual code image coordinate system;
    computing a rotation angle of said at least one visual code located in said visual code image;
    computing horizontal and vertical tilting values of said at least one visual code;
    computing a distance of said at least one visual code from said mobile device;
    reading encoded bits in said at least one visual code to produce at least one decoded value; and
    displaying information on the mobile device associated with at least one of the identified regions of interest based on at least one of the at least one decoded value, the first projective mapping, the second projective mapping, the rotation angle, the horizontal tilting value, the vertical tilting value, and the distance.

25. A device for decoding a visual code, comprising:
    a memory;
    a digital camera;
    a display; and
    a processor in communication with the memory, the digital camera, and the display; wherein the processor captures a visual code image comprising at least one visual code;

grayscales said visual code image;

thresholds said visual code image;

identifies regions of interest in said visual code image;

calculates the orientations and shapes of the identified regions of interest within said visual code image;

locates said at least one visual code within said visual code image;

computes a first projective mapping of said at least one visual code from a visual code image coordinate system to a visual code coordinate system;

computes a second projective mapping of said at least one visual code from the visual code coordinate system to the visual code image coordinate system;

computes a rotation angle of said at least one visual code located in said visual code image;

computes horizontal and vertical tilting values of said at least one visual code;

computes a distance of said at least one visual code from said mobile device;

reads encoded bits in said at least one visual code to produce at least one decoded value; and displays information associated with at least one of the identified regions of interest based on at least one of the at least one decoded value, the first projective mapping, the second projective mapping, the rotation angle, the horizontal tilting value, the vertical tilting value, and the distance.

* * * * *